Oct. 21, 1958   H. BLACKSTONE   2,856,809
STEREOSCOPIC VIEWER
Filed Aug. 31, 1954
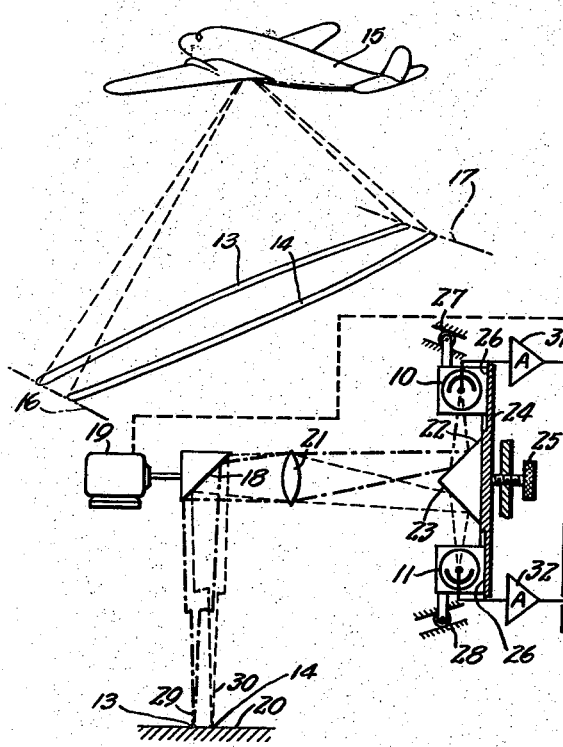
INVENTOR
HENRY BLACKSTONE
BY
Mitchell Bechert
ATTORNEYS

United States Patent Office 2,856,809
Patented Oct. 21, 1958

2,856,809

STEREOSCOPIC VIEWER

Henry Blackstone, Northport, N. Y., assignor to Servo Corporation of America, New Hyde Park, N. Y., a corporation of New York Application August 31, 1954, Serial No. 453,390

10 Claims. (Cl. 88—1)

My invention relates to optical scanning mechanisms, as of the type particularly adaptable to airborne-reconnaissance operations.

It is an object to provide improved means of the character indicated.

It is another object to provide improved airborne reconnaissance equipment in which, with relatively little modification of existing apparatus and techniques, a substantial improvement in interpretability may be achieved.

It is a specific object to provide a scanner of the character indicated for automatically developing two displays suitable for stereoscopic viewing in order to improve the interpretability of the recorded information.

It is a further object to provide viewing means for records produced by apparatus meeting the above objects.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified view in perspective illustrating an aircraft equipped with apparatus of the invention and depicting a terrain-scanning operation with such equipment;

Fig. 2 is a diagram of optical, mechanical, and electrical elements of my equipment;

Fig. 3 is a fragmentary diagram of alternative components for a part of the equipment of Fig. 2;

Fig. 4 is a view of a further alternative; and

Fig. 5 is a simplified view in perspective of viewing equipment for interpreting a record produced by the equipment of Fig. 4.

Briefly stated, my invention contemplates application to the type of optical scanner in which a scanning mirror is continuously rotated about an axis inclined with respect to a normal thereto. Usually, this inclination is approximately 45 degrees, so that a scanning beam may be caused to traverse a substantially radial plane, and the collected light or other energy reflected by the mirror may be passed longitudinally with respect to the rotation axis. The optical system, which includes the mirror, ordinarily passes the received energy for focus on a photocell or other energy-responsive means.

In accordance with the invention, I provide two separate cells or energy-responsive means, with at least one and preferably both cells offset from the predominant optical axis, so that for each cell there may be said to be a slightly displaced optical axis which, as far as the scanning mirror is concerned, is caused to sweep in a separate line as a result of scan action. Depending upon the application, the angular separation of axes for the cells may be various, and I provide for relatively simple adjustment of this separation. The separate video outputs of the cells may be caused to develop separate strip records which may later be stereoscopically viewed.

Referring to Figs. 1 and 2 of the drawings, my invention is shown in application to an aerial-reconnaissance type device having two energy-responsive elements 10—11, such as photoelectric cells, which are caused, through mechanically moving optical elements, to scan spaced strips 13—14 on the terrain beneath a carrying aircraft 15. The scanning action may be one of repetitive lateral sweep, as from the limit 16 to the limit 17, repeated for each cycle of the scanning optics.

The optical scanner may comprise a first inclined mirror 18 mounted for rotation about an axis inclined to its predominant reflecting surface (i. e. inclined with respect to a normal to the mirror surface), and in the form shown this inclination is substantially 45°. A continuously running motor 19 drives the mirror 18. The rotation axis of mirror 18 is preferably generally aligned with the flight axis of the aircraft 15, and suitable window means (not shown) in the belly of the aircraft may permit the mirror 18 to observe the terrain 20 in a generally vertical scanning plane. Energy collected in this plane is reflected along the axis of rotation and may be focused by suitable optics 21 at some location further along the axis of rotation; alternatively, by employment of offsetting mirrors, as at 22—23, the collected energy may be directed to the respective cells 10—11.

In Fig. 2, I indicate my preference for a symmetrical employment of the mirrors 22—23, and I mount the photocells and the mirror means 22—23 on a common supporting framework 24, longitudinally adjustably positioned by means 25, for a purpose to be made clear. The cells 10—11 are preferably outwardly slidable, as governed by guides 26 on the frame 24, and cam-and-follower means 27—28 referenced to the frame may develop a desired outward and inward movement of cells 10—11 with respect to the rotary axis, as the mirror 22—23 is adjustably positioned along the rotary axis.

Each of the cells 10—11 may be effectively offset from the predominant axis of the optical system and on opposite sides thereof. Thus, response of cell 10 through the optical system may be as indicated by the heavy phantom lines, so as to cause cell 10 to scan line 13 by a first beam 29. By the same token, cell 11 scans line 14 by a second beam 30 (light phantom lines). The video outputs of the respective cells may be suitably amplified at 31—32 and passed to appropriate display or recording means. In the form shown, the recording means comprises writing elements 35—36, such as styli, carried on separate endless belts 37—38. Belts 37—38 may be mechanically ganged and continuously driven by a motor 39.

The styli 35—36 may traverse limited paths 40—41 across separate strips of suitably sensitive recording paper or film 42—43, supported and advanced by separate mechanisms; these mechanisms may include feed rollers 44—45, interconnected at 46 and driven by a motor 47 to assure synchronized feeds of the sensitive strips or charts 42—43. The sensitive recording paper may be of the variety which is responsive to an electrical charge or discharge (across the thickness of the paper) to create a permanent mark on the paper and may thus be one of the varieties used in facsimile applications. Depending upon the particular recording method employed, various techniques may be adopted to supply the video signals from amplifiers 31—32 to the respective recording charts. However, in the form shown, I connect these video amplifiers to the suitably contoured electrode plates 48—49 beneath the respective recording papers 42—43, the circuit to ground being completed at 50 in each case; the electrode plates 48—49 may extend substantially the full width of papers 42—43 and, for fidelity, should be bowed oppositely (as suggested in the drawing) to conform with the bowed nature (see Fig. 1) of scan lines 13—14 on the ground. To ensure that the styli can produce records regardless of lateral position on strips 42—43, the styli are each of effective longitudinal length to cover the bowed extent of the electrode plates 48—49 they respectively traverse.

In operation, both cells 10—11 will, through mirror 18, simultaneously scan the lines 13—14, once for each scan operation. For each such scan operation, the styli 35—36 will traverse their respective recording strips or papers 42—43 (with a lateral sweep action), causing oppositely bowed intensity-modulated lines to be recorded for the respective video signals produced by sweep through the scan lines 13—14. If the speed of paper-feed means 44—45 is sufficiently correlated with the aircraft velocity as a function of height (as suggested by means 51, governing the speed of motor 47), the recordings developed on charts 42—43 will each be a faithful reproduction of the energy pattern on the terrain; these energy patterns will be as viewed from the slightly eccentrically displaced axes of the two elements 10—11. By employment of suitable stereoscopic viewing means observing both charts simultaneously (suggested at 52), three-dimensional effects may be achieved. For various purposes, it is desirable to produce different degrees of exaggerated stereoscopic effect, and by adjustably positioning the mirror 22—23 at knob 25, the physical offset between the two responses may be varied, thus permitting recordings from which accentuated stereoscopic effects may be observed.

In Fig. 3, I show a slight modification of the means of support for and positioning of two energy-responsive elements 10—11 in conjunction with a single mirror 55. Other parts of the scanning optics duplicate those disclosed in Fig. 2 and are therefore given the same reference numerals. In Fig. 3, the lateral spacing of cell responses is conveniently adjusted by means of a single knob 56 operating a differential screw having one part 57 for displacing the cell 10 and a second part 58 for displacing the cell 11. By adjusting the knob 56, the effective angular separation δ between scanning beams may be selectively controlled, thus accentuating stereoscopic effects in the respective displays or recordings of the integrated video outputs of cells 10 and 11.

In Fig. 4, I show a slight modification of the recording means which may be employed in conjunction with either of the scanning arrangements of Figs. 2 and 3; such elements as correspond to those of Fig. 2 are given the same reference numbers. In the arrangement of Fig. 4, recording is accomplished on a single sheet 60 of sensitized paper or film, by means of another stylus-operated recorder. The single sheet 60 may be continuously driven by a feed roll 59 coupled to a motor 61, which in turn may be governed by the v./h. rate of the aircraft, as available from a suitable computer 62. The recordings are produced side by side for the outputs of the respective cells 10—11, and for this purpose it is convenient to employ a single belt carrying spaced multiple styli 64 and driven by a motor 65 synchronized with the scan-drive motor 19 (as suggested by the dashed-line interconnection shown). Separate bowed electrodes 66—67 may be continuously supplied with the respective video outputs of cells 10—11. Electrodes 66—67 are shown in end-to-end relation beneath the path swept by styli 64, and means 68 may complete both recording circuits to ground. Blanking means 71 operating in synchronism with the scan drive may effectively disable the respective amplifiers 31—32 during the dead or non-utilitarian portions of the scanning cycle, thus avoiding unwarranted clutter in the resulting record, as will be understood.

In operation, the advancing paper 60 will develop two side-by-side integrated displays of video outputs of cells 10—11. These recordings may be stored and later interpreted by suitable viewing apparatus, such as depicted in Fig. 5. In the stereoscopic viewer of Fig. 5, the separate viewing lenses 75—76 are spaced longitudinally with respect to the direction of advance of the strip-record paper 60. This advance may be mechanically controlled for operation of either knob 77 or knob 78 in the direction desired. A first pair of periscope mirrors 79—80 may offset the axis of lens 75 for appropriate placement with respect to the strip 81 (developed, say, on the right-hand side of the sheet 16, and similar periscope mirrors 82—83 may offset the axis of lens 76 for viewing the other strip record 84. If desired, the two mirrors 80—82 may be mounted for adjustment (by means not shown) in order to control the relative offsets of axes 87—88 for viewing the respective strips 81—84 and in order to get proper superposition of images for stereoscopic viewing, as will be understood.

It will be seen that I have described a basically simple mechanism adaptable to an existing type of reconnaissance scanner and capable of greatly enhancing its utility by permitting stereoscopic viewing of recordings. The additional complexity by reason of my improvement is negligible compared to the improved interpretability which results.

While I have described my invention in detail for the preferred forms shown, it will be understood that modifications may be made within the scope of the invention as defined in the claims which follow.

I claim:

1. Optical scanning means for scanning in essentially a given surface from a location offset from said surface, comprising optics including a mirror mounted for rotation about an axis inclined to its predominant reflecting surface, said axis of rotation being substantially parallel to the surface to be scanned, beam-splitting means mounted substantially in alignment with said axis, separate energy-responsive elements responsive separately to split parts of a beam collected by said optics, one of said separate energy-responsive elements being misaligned with respect to the axis of symmetry of said optics, whereby, upon rotation of said mirror, said optics may cause separate images of said energy-responsive elements to sweep spaced scan lines in said surface, and display means synchronized with rotation of said mirror and fed by the outputs of said energy-responsive means, said display means including a first area reflecting modulation by the output of one of said elements and a second area reflecting modulation by the output of the other of said elements.

2. Optical scanning means for scanning in essentially a given surface from a location offset from said surface, comprising optics including a mirror mounted for rotation about an axis inclined substantially 45 degrees to its predominant reflecting surface, said axis being substantially parallel to the surface to be scanned, a non-rotatably mounted mirror inclined substantially 45 degrees to said axis of rotation and in intercepting relation with light reflected by said rotatable mirror, two energy-responsive elements in intercepting relation with energy collected by said rotatable mirror, at least one of said elements being in intercepting relation with energy passing both said mirrors, one of said elements being misaligned with respect to the predominant optical axis through both said mirrors, whereby, upon rotation said optics may cause separate images of said energy-responsive elements to sweep spaced scan lines in said surface, and display means synchronized with rotation of said first-mentioned mirror and fed by the outputs of said energy-responsive means, said display means including a first area reflecting modulation by one of said elements and a second area reflecting modulation by the other of said elements.

3. Optical scanning means for scanning in essentially a given surface from a location offset from said surface, comprising optics including a mirror mounted for rotation about an axis inclined substantially 45 degrees to its predominant reflecting surface, said axis of rotation being substantially parallel to the surface to be scanned, a non-rotatably mounted mirror inclined substantially 45 degrees to said axis of rotation and in intercepting relation with energy passed by said rotatable mirror, and two separate energy-responsive elements in intercepting relation with energy passed by both said mirrors, said elements being spaced from each other, one of said elements being spaced from the predominant axis of said optics, and display means synchronized with rotation of said rotatable mirror and fed by the outputs of said energy-responsive means, said display means including a first area reflecting modulation by the output of one of said elements and a second area reflecting modulation by the output of the other of said elements.

4. Scanning means according to claim 3, in which both said elements are offset symmetrically with respect to the predominant axis of said optics.

5. Scanning means according to claim 3, including means for selectively adjusting the extent of offset of said one element with respect to said predominant axis.

6. Scanning means according to claim 3, and including means for selectively adjusting the extent of offset of both said elements with respect to said predominant axis.

7. Optical scanning means for scanning in essentially a given surface from a location offset from said surface, comprising optics including a mirror mounted for rotation about an axis inclined to its predominant reflecting surface, said axis of rotation being substantially parallel to the surface to be scanned, a non-rotatably mounted mirror inclined to said axis and in intercepting relation with energy collected by said rotating mirror, two energy-responsive elements spaced from each other and in intercepting relation with energy collected by said rotatable mirror, at least one of said elements being also in intercepting relation with energy passed by said fixed mirror, one of said elements being offset from the predominant axis of symmetry of said axis, and separate strip-recording means having a lateral sweep synchronized with scan rotation and separately responsive to the outputs of said elements, and means for progressing the separate records in synchronism.

8. Scanning means according to claim 7, in which said last-defined means includes a computer responsive to velocity as a function of altitude in an aircraft.

9. Scanning means according to claim 7, in which said separate recording means comprises two separate recorders ganged for operation in unison.

10. Scanning means according to claim 7, in which said separate recording means comprises means for separately recording the outputs of said elements side-by-side on the same strip of recording sheet material.

References Cited in the file of this patent

UNITED STATES PATENTS

| | | |
|---|---|---|
| 1,966,354 | Noxon | July 10, 1934 |
| 2,408,115 | Varian | Sept. 24, 1946 |
| 2,762,123 | Schultz et al. | Sept. 11, 1956 |